US012122660B2

(12) United States Patent
Wolthers et al.

(10) Patent No.: US 12,122,660 B2
(45) Date of Patent: Oct. 22, 2024

(54) BEVERAGE DISPENSING SYSTEM, BEVERAGE CONTAINER AND PRESSURIZING SYSTEM FOR USE IN A BEVERAGE DISPENSING SYSTEM OR CONTAINER

(71) Applicant: HEINEKEN SUPPLY CHAIN B.V., Amsterdam (NL)

(72) Inventors: Wolter Wolthers, Amsterdam (NL); Bernardus Cornelis Johannes Landman, Amsterdam (NL); Thomas Theodorus Nicolaas Johannes WAGEMAKERS, Amsterdam (NL)

(73) Assignee: Heineken Supply Chain B.V., Amsterdam (NL)

( * ) Notice: Subject to any disclaimer, the term of this patent is extended or adjusted under 35 U.S.C. 154(b) by 0 days.

(21) Appl. No.: 17/838,657

(22) Filed: Jun. 13, 2022

(65) Prior Publication Data

US 2022/0297999 A1 Sep. 22, 2022

Related U.S. Application Data

(63) Continuation of application No. 15/317,155, filed as application No. PCT/NL2015/050428 on Jun. 11, 2015, now Pat. No. 11,377,339.

(30) Foreign Application Priority Data

Jun. 11, 2014 (NL) ...................................... 2012981

(51) Int. Cl.
*B67D 1/12* (2006.01)
*B65D 83/66* (2006.01)
*B67D 1/04* (2006.01)

(52) U.S. Cl.
CPC ......... *B67D 1/1252* (2013.01); *B65D 83/663* (2013.01); *B67D 1/0406* (2013.01); *B67D 1/0412* (2013.01); *B67D 1/0418* (2013.01)

(58) Field of Classification Search
CPC .. B67D 1/0406; B67D 1/0412; B67D 1/0418; B67D 1/1252; B67D 1/0437; B65D 83/663; B65D 83/70; B65D 83/64
See application file for complete search history.

(56) References Cited

U.S. PATENT DOCUMENTS 3,460,555 A 8/1969 Puster
3,613,954 A 10/1971 Bayne
(Continued)

FOREIGN PATENT DOCUMENTS

CN 101616861 A 12/2009
CN 102056810 A 5/2011
(Continued)

*Primary Examiner* — Vishal Pancholi
*Assistant Examiner* — Robert K Nichols, II
(74) *Attorney, Agent, or Firm* — Banner & Witcoff, Ltd.

(57) ABSTRACT

Beverage dispensing system, beverage container and pressurizing system for use in a beverage dispensing system or container. Beverage dispensing system 1 comprising a beverage container 2 with a beverage compartment 3 and a pressurizing system 10, wherein the pressurizing system 10 comprises a gas container 11 comprising pressurized gas, a closure 13 closing the gas container 11 and a pressure regulator 12 operative for opening the closure 13 for allowing gas to enter into the beverage compartment 3 from the gas container 11, wherein the pressure regulator 12 comprises a regulating chamber 15 having at least a wall part 17 movable and/or deformable based on pressure in the beverage compartment 3, wherein at least one opening 24 is provided through a wall 18 of the regulating chamber 15
(Continued)

providing for at least part of a gas passage between the regulating chamber 15 and the beverage compartment 3.

9 Claims, 12 Drawing Sheets

(56) References Cited

U.S. PATENT DOCUMENTS

| | | | |
|---|---|---|---|
| 4,702,396 | A | 10/1987 | Gwiazda |
| 5,368,207 | A | 11/1994 | Cruysberghs |
| 6,412,668 | B1 | 7/2002 | Mooswijk |
| 7,021,559 | B2 | 4/2006 | Fraser-Easton |
| 7,708,171 | B2 | 5/2010 | Regan et al. |
| 8,177,103 | B2 | 5/2012 | Pakkert et al. |
| 8,202,384 | B2 | 6/2012 | Aburatani |
| 2004/0050880 | A1 | 3/2004 | Fraser-Easton |
| 2007/0125809 | A1 | 6/2007 | Regan et al. |
| 2008/0116230 | A1 | 5/2008 | Pakkert et al. |
| 2010/0059543 | A1 | 3/2010 | Paauwe et al. |
| 2011/0036414 | A1 | 2/2011 | Paauwe |
| 2011/0036807 | A1 | 2/2011 | Landman |
| 2011/0038989 | A1 | 2/2011 | Andman |
| 2011/0061743 | A1 | 3/2011 | Humphries |
| 2013/0068798 | A1 | 3/2013 | Landman et al. |
| 2013/0074978 | A1 | 3/2013 | Rasmussen |
| 2013/0233878 | A1 | 9/2013 | Lindmayer |
| 2013/0233895 | A1 | 9/2013 | Landman et al. |
| 2014/0027453 | A1 | 1/2014 | Landman |

FOREIGN PATENT DOCUMENTS

| | | | |
|---|---|---|---|
| CN | 202063372 | U | 12/2011 |
| CN | 102947214 | A | 2/2013 |
| CN | 103370274 | A | 10/2013 |
| EP | 1 064 221 | A1 | 1/2001 |
| JP | S60-112497 | | 7/1985 |
| JP | S61-175678 | | 11/1986 |
| JP | 2005515945 | | 6/2005 |
| JP | 2006528114 | | 12/2006 |
| JP | 2007519578 | | 7/2007 |
| JP | 2010510138 | | 4/2010 |
| JP | 2012-513346 | | 6/2012 |
| JP | 2013533173 | | 8/2013 |
| WO | 99/47451 | A1 | 9/1999 |
| WO | 9944890 | | 9/1999 |
| WO | 00/35774 | A1 | 6/2000 |
| WO | 2008/060157 | A1 | 5/2008 |
| WO | 2009/123448 | A1 | 10/2009 |
| WO | 2011/152717 | A1 | 12/2011 |
| WO | 2012/112035 | A1 | 8/2012 |
| WO | 2013113657 | A1 | 8/2013 |

BEVERAGE DISPENSING SYSTEM, BEVERAGE CONTAINER AND PRESSURIZING SYSTEM FOR USE IN A BEVERAGE DISPENSING SYSTEM OR CONTAINER

CROSS-REFERENCE TO RELATED APPLICATION

This is a continuation application of U.S. patent application Ser. No. 15/317,155, filed on Dec. 8, 2016, which is a U.S. national phase application under 35 U.S.C. § 371 of PCT Application No. PCT/NL2015/050428 filed on Jun. 11, 2015, which claims the benefit of NL Patent Application No. 2012981 filed on Jun. 11, 2014, the disclosures of which are incorporated herein by reference.

The invention relates to a beverage dispensing system with a pressurizing system which is self regulating.

In EP1064221 a beverage dispensing system is disclosed, comprising a container with a self regulating pressurizing system. The pressurizing system comprises a gas container comprising pressurized gas, a closure closing the gas container and a pressure regulator operative for opening the closure for allowing gas to enter into the beverage compartment from the gas container. The pressure regulator comprises a regulating chamber having at least a wall part movable based on pressure in the beverage compartment, such that when the pressure drops in the beverage compartment, for example due to dispensing beverage therefrom, the movable wall will move and will open the closure of the gas container, allowing gas to enter into the beverage compartment, increasing the pressure therein. This will move the movable wall back, allowing the closure to close again once the desired pressure in the beverage compartment is reached.

In EP1064221 the pressurizer with the gas container and the pressure regulator is introduced into the container prior to or directly after filling, after which the container is closed. The pressure regulator is therefore inside the beverage compartment at all times after closure, under the influence of the pressure inside said compartment, including during storage and transport. Prior to introduction into the container the pressure regulator has to be prevented from opening the closure of the gas container because otherwise most of if not all of the gas will flow out of the gas container before it is introduced into the container. WO200035774 discloses a pressurizing device which can be activated after introduction into the container. Prior to activation the regulator is operationally separated from the closure, such that movement of the movable wall will not open the closure. Such system is however complicated, relatively expensive and may be prone to faults.

The known pressurizing system moreover have the problem that $CO_2$ gas may enter into the regulating chamber due to migration of the gas through the wall into the chamber for equalizing the partial pressure of CO2 gas on either side of said wall, which gas will not leave the chamber anymore during use of the regulator. This will increase the internal pressure in said chamber over time, which will increase the regulating pressure inside the beverage compartment accordingly. Furthermore these pressurizing systems have the disadvantage that the regulating pressure is set at a given, predetermined value, such that at a predetermined, preferred temperature of the beverage the pressure will be regulated at about the equilibrium pressure of the beverage, such that the carbonation of the beverage at that temperature will not change. This means that at other temperatures the pressure will be regulated above or below said equilibrium pressure and thus will lead to over or under saturation of gas in the beverage. Moreover, when the beverage is cooled to a low temperature, this may reduce the pressure inside the container to such a level that the pressure regulator will start regulating undesirably. Furthermore these pressure regulating devices will comprise metal parts as well as plastic parts, which may influence recyclability.

WO2011/152717 discloses a container with a pressurizing system in which a flexible membrane is provided with a closure element for closing off a gas opening of a high pressure gas container. This closure element is pulled into the opening when the membrane is pressurized into a dome shape by gas pressure inside the beverage container and/or gas flowing from the gas container. At the side opposite the closure element atmospheric pressure acts on the membrane. A relatively large passage is provided between the space enclosed below the membrane and the beverage compartment, which passage is closed by the membrane when no beverage is dispensed. A second, small passage is provided between said space and the beverage compartment, which is open and will allow a pressure equilibrium to be formed between the said space and the beverage compartment over time, which time is longer than the time normally required for tapping a glass of beer. In this known system thus the regulating pressure is defined by at least the flexibility of the membrane and the pressure difference between the pressure inside the beverage compartment and the atmospheric pressure. Gas may pass through the membrane over time, resulting in a loss of gas and pressure. The pressure regulating system is integrated with the high pressure gas container since the membrane carries the closure element. The system again will have to be kept deactivated prior to use and needs to be activated in order to start regulating the pressure. Then the membrane will continuously be under pressure and therefore stretched to the dome shape. This will mean that the regulating pressure will change over time, due to aging of and relaxation in the material of the membrane. Especially during periods when there is no dispensing, for example during storage and transport. This system is prone to regulating mistakes and malfunction and cannot be checked prior to use. Moreover it is difficult to manufacture properly, especially the small opening which necessitates an accurate flow over time for equilibrium in a desired time frame and proper positioning and mounting of the closure element and the membrane. Moreover, again the regulating pressure is fixed on a predetermined pressure, chosen for regulating at an equilibrium pressure of the beverage at a specific desired temperature of the beverage, which will lead to over or under saturation of gas in the beverage at other temperatures and especially at very low temperatures.

An aim of the present disclosure is to provide an alternative beverage dispensing system.

An aim of the present disclosure is providing a beverage dispensing system with which at least one of the above mentioned disadvantages and/or problems of the art is at least partly solved or avoided.

An aim of the present disclosure is to provide for a beverage dispensing system having a pressurizing system which has a regulating pressure which is dependent on the temperature of the system and/or beverage contained therein.

An aim of the present disclosure is to provide for a beverage dispensing system with a pressurizing system which can be used without the necessity to activate the system.

An aim of the present disclosure is to provide for a container comprising a pressure regulating device inside the container, which pressure regulating device can adapt the regulating pressure in relation to temperature changes of a system or beverage with which it is used.

An aim of the present disclosure is to provide for a pressurizing device for regulating the pressure in a beverage container or beverage dispensing system, with which at least one of the problems and disadvantages of the regulators known from WO2011/152717 or EP1064221 is at least partly solved or at least partly diminished.

At least one of these and other aims and advantages is obtained with a system, device and/or container according to this disclosure.

In a first aspect a beverage dispensing system according to the present disclosure can comprise a beverage container with a beverage compartment and a pressurizing system. The pressurizing system comprises a gas container comprising pressurized gas, a closure closing the gas container and a pressure regulator operative for opening the closure for allowing gas to enter into the beverage compartment from the gas container. The pressure regulator comprises a regulating chamber having at least a wall part movable and/or deformable based on pressure in the beverage compartment. According to the disclosure at least one opening is provided through a wall of the regulating chamber providing for at least part of a gas passage between the regulating chamber and the beverage compartment. The at least one movable and/or deformable wall part is operative for opening and allowing closure of the closure as indicated.

The at least one opening allows gas to enter the gas from the beverage compartment into the pressure regulating chamber or exit the pressure regulator chamber.

The gas can enter or exit the pressure regulator chamber only relatively slowly, such that pressure changes inside the chamber will take longer than pressure changes which will occur during dispensing of beverage from the container. Preferably the at least one opening is dimensioned such that a relatively well determined flow of gas will be allowed into and/or out of the chamber.

In embodiments the at least one opening can be formed as a small piercing of a wall of the container, for example by a single pinhole having a cross section of for example one to a few tens of square μm, or multiple such holes having a combined cross section of for example one to a few tens of square μm. In embodiments the at least one opening can be formed between two or more adjacent parts of the pressure regulator, such as walls of the chamber. The at least one opening can be formed by surface roughness of mating surface areas or parts of the pressure regulator. The at least one opening can for example be formed as an annular ring between two complementary parts forming part of the regulating chamber.

In an aspect the present disclosure can be characterized in that the at least one opening defines a passage which is relatively small, preferably such that, when the pressure inside the regulating chamber and the beverage compartment is substantially equal, gas can pass through more easily than fluid, especially the beverage, more preferably gas can pass through said opening or openings but fluid cannot. Alternatively a series of openings can be provided between the regulating chamber and the beverage compartment, wherein each opening defines a passage which is relatively small, preferably such that when the pressure inside the regulating chamber and the beverage compartment is substantially equal gas can pass through said opening or openings but fluid cannot.

In embodiments the opening or openings can be defined such that the at least one opening or combination of the series of openings define a passage such that a relatively sudden pressure drop in the beverage compartment, such as during dispensing of an amount of beverage therefrom, resulting in a pressure drop inside the regulating chamber cannot be compensated in the same period of time by supply of gas through the passage from the beverage compartment to the regulating chamber, but allows such compensation over a longer period of time. Alternatively or additionally the at least one opening or series of openings together can be defined such that over an extended period of time, when no beverage is dispensed, temperature changes of the beverage leading to a change of pressure in the beverage compartment will be followed by the same pressure change inside the regulating chamber, preferably without supply of gas from the gas container.

In embodiments a relatively long path can be provided for the gas connected to said at least one opening, such that gas coming from the beverage compartment will flow through said channel before entering into said at least one opening. The channel is preferably such that beverage will not be able to enter all the way into said channel, thus preventing the beverage from reaching the at least one opening into the regulating chamber. In embodiments said channel is provided in or as a labyrinth. In embodiments the labyrinth can comprise a first end at or near the at least one opening and a second end at the opposite end of the labyrinth, especially in the beverage compartment, wherein a gas inlet into the labyrinth is provided at the first end or between the first and second end, connecting to the closure or a space at least partly surrounding the closure, such that when the closure is opened gas flowing from the gas container flows through said labyrinth into the beverage compartment.

In an aspect the present disclosure can be characterized by a container comprising an inner volume for storage of beverage and a pressure regulating device comprising a pressure regulator and a pressure gas reservoir comprising an outlet with a valve, wherein the pressure regulator is arranged for opening the valve, wherein the pressure regulator comprises a chamber having at least one wall part defined by a movable and/or deformable element, wherein the chamber comprises a gas, wherein the chamber is provided with a gas passage to a surrounding of the chamber, especially into the inner volume of the container for storage.

In an aspect the present disclosure can be characterized by a pressurizing device, comprising a pressure regulator and a pressure gas reservoir comprising an outlet with a valve, wherein the pressure regulator is arranged for opening the valve. The pressure regulator comprises a chamber having at least one wall part defined by a movable and/or deformable element, wherein the chamber is substantially liquid tight and comprises a gas. The chamber is provided with a gas passage to a surrounding of the chamber, such that upon movement of the movable and/or deformable element into the chamber, reducing an inner volume of the chamber faster than an amount of gas equal to said reduction of volume can escape through said passage, the gas in said chamber is compressed.

Gas can preferably move into and out of the chamber through said passage for equalizing pressure difference between the chamber and a surrounding of the chamber relatively slowly.

Other characteristics and advantages connected to the suggested solutions will become clear from the following detailed description of various embodiments where reference numerals refer to the annexed drawings provided by way of example and wherein.

Figure 10:
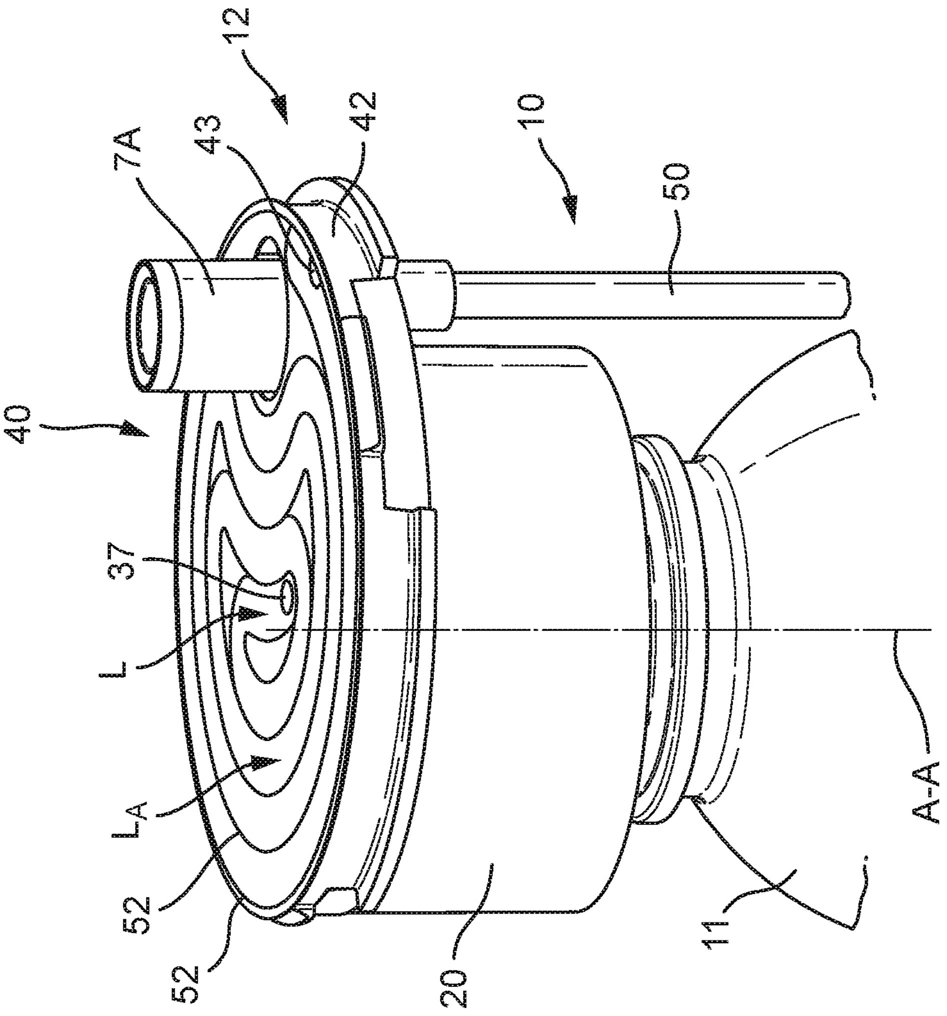
FIG. 10 shows an enlarged view of the upper part of FIG. 9, showing the pressure regulating chamber with a labyrinth, a lid of the labyrinth having been removed.
Figure 9:
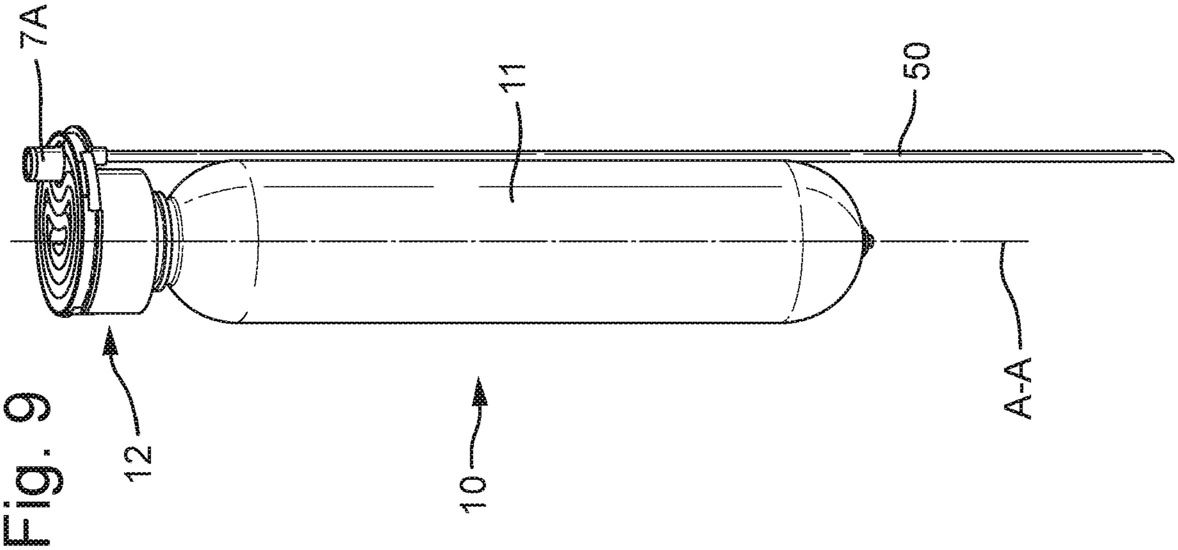
FIG. 9 shows in perspective view schematically an alternative embodiment of a pressurizing device, with open labyrinth.
Figure 11:
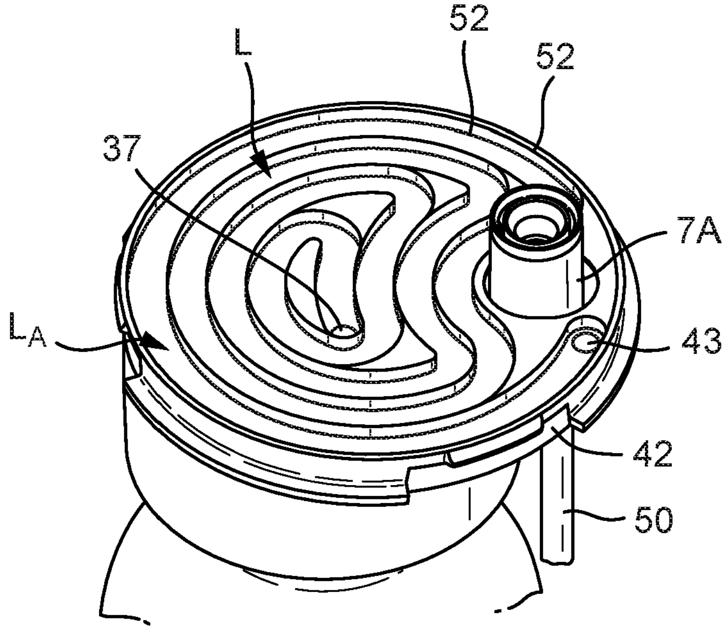
FIG. 11 shows in perspective top view a pressurizing device with a labyrinth for forming a connection between a beverage storage compartment of a container and a pressure regulating chamber of the pressurizing device.
Figure 12:
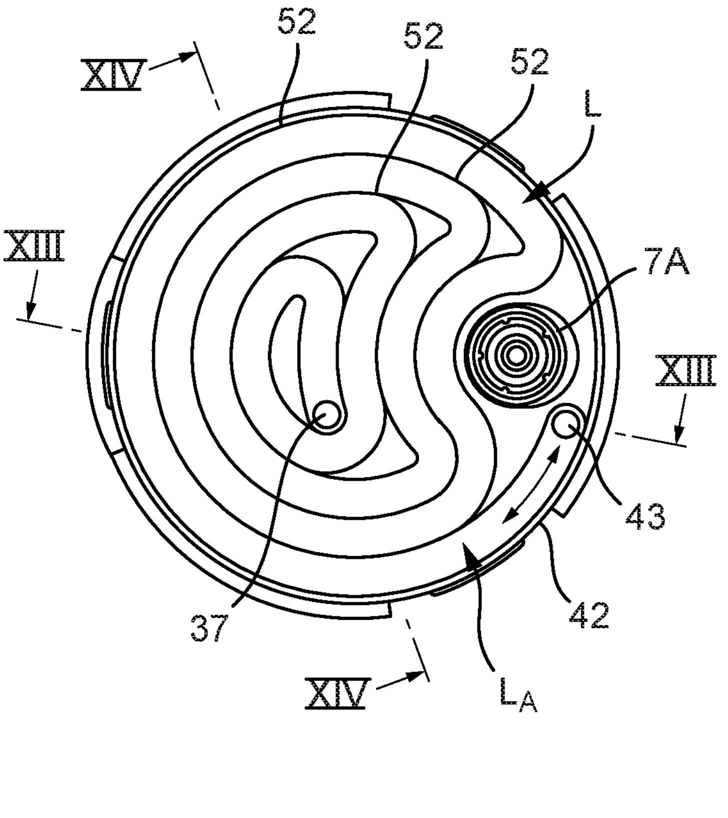
Figure 13A:
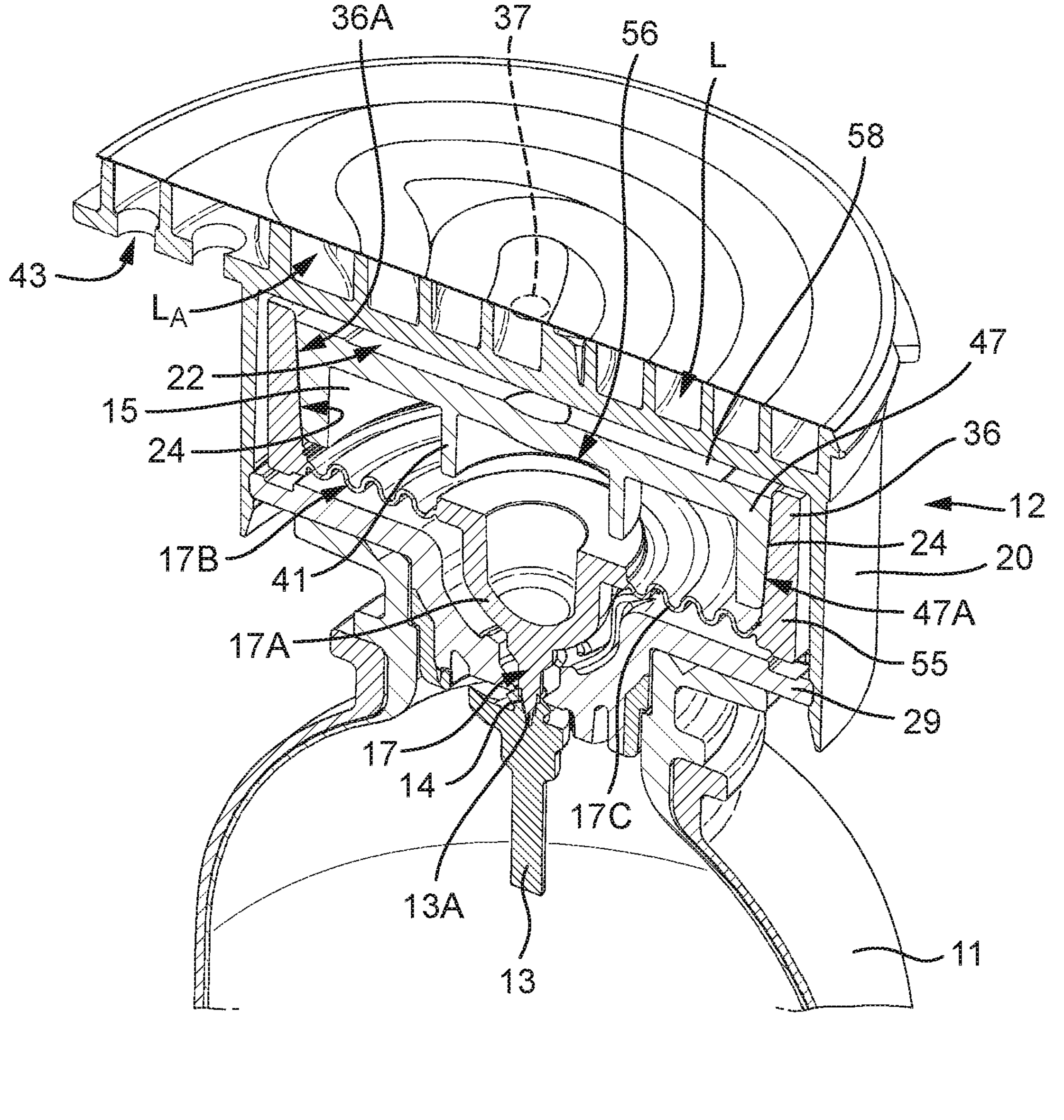
Figure 13B:
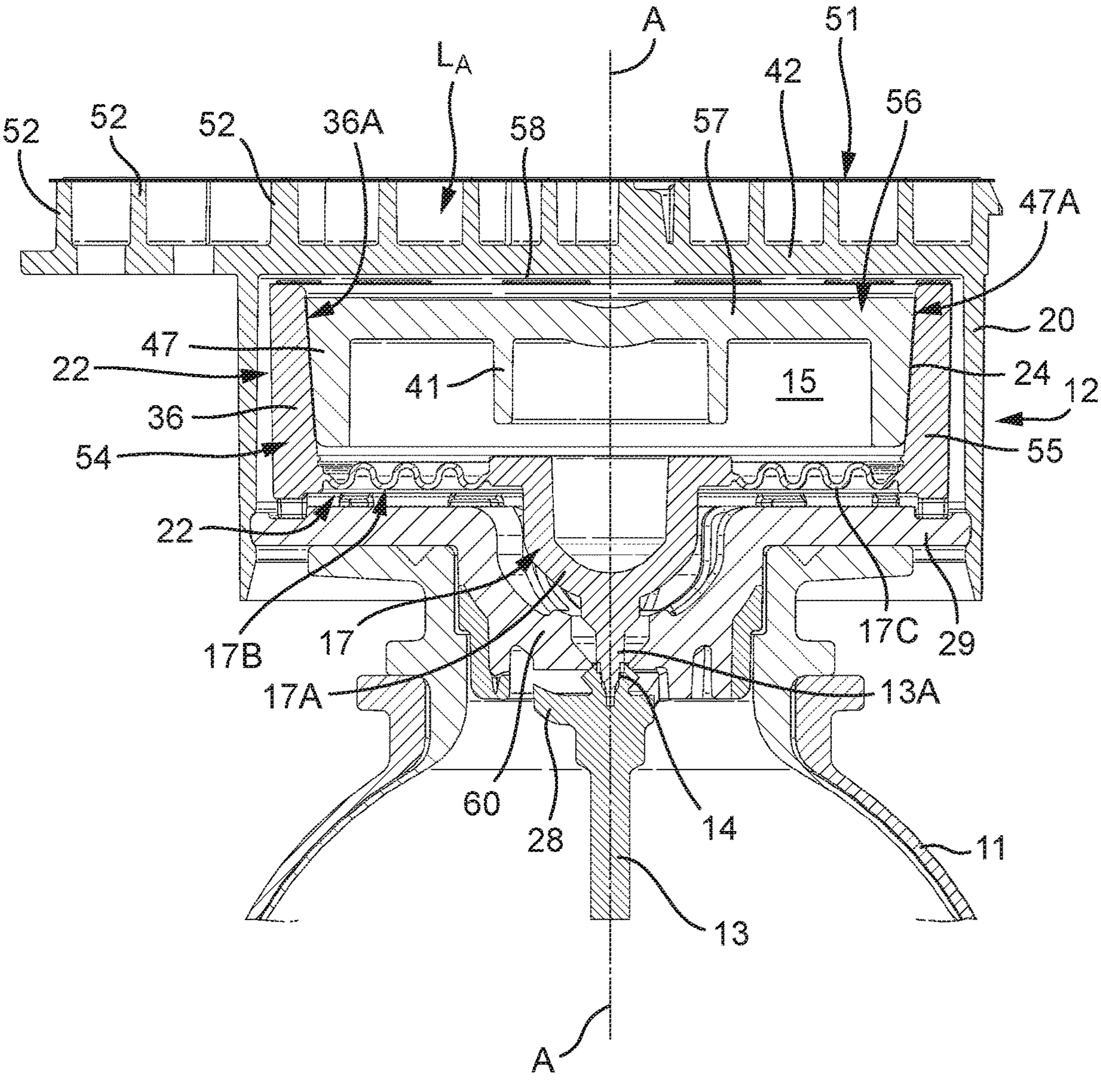
Figure 14A:
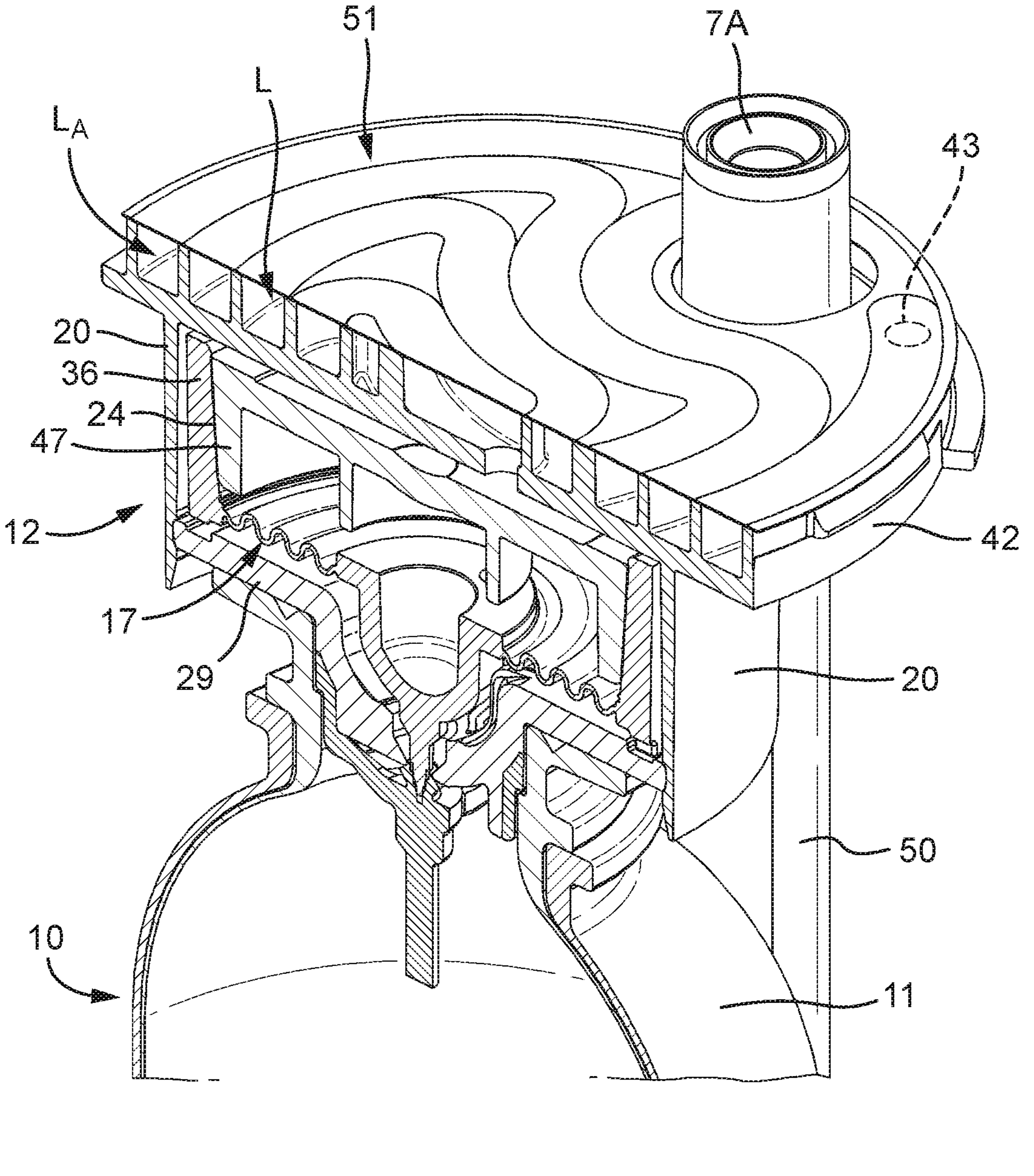
Figure 14B:
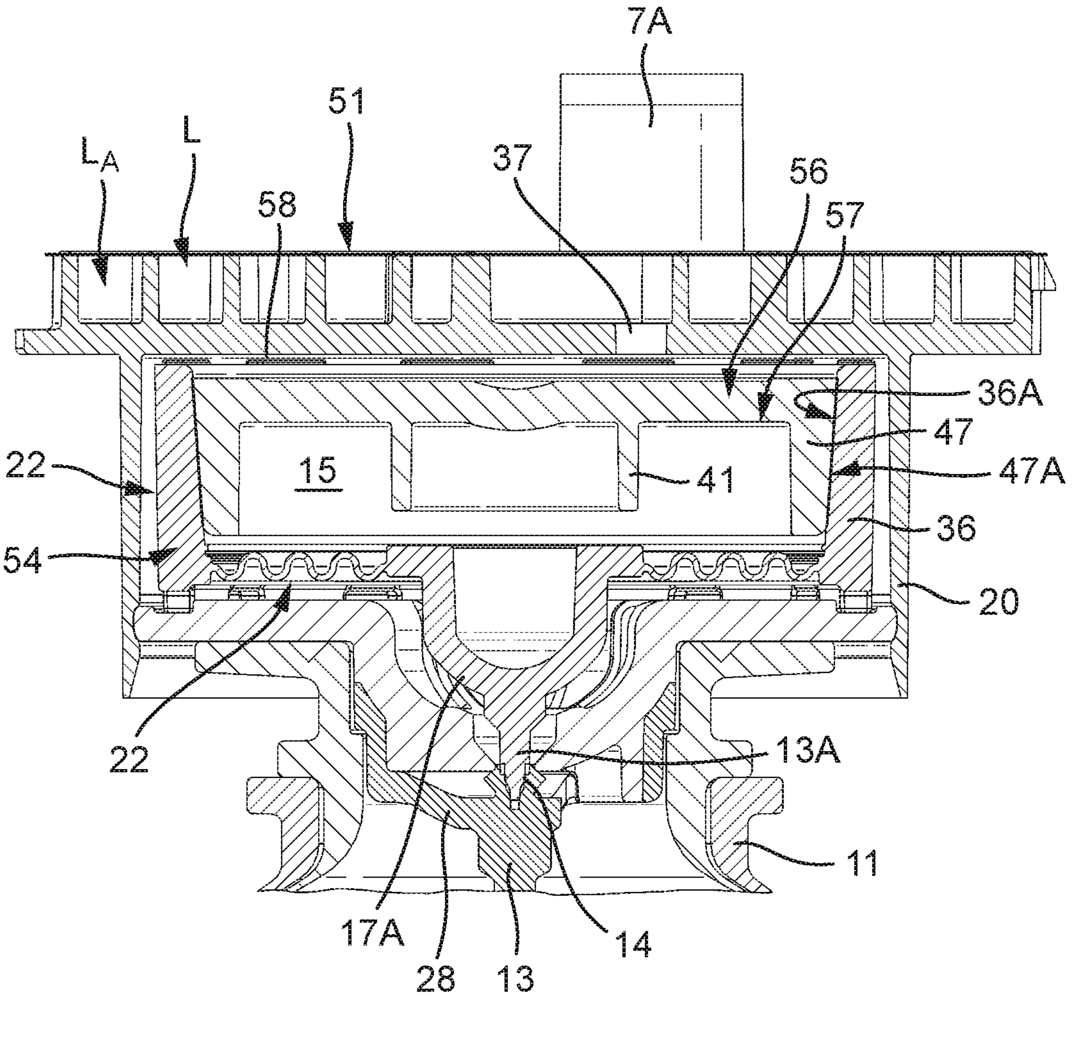

FIG. 12 shows in top view the device of FIG. 9-11, with the lid of the labyrinth having been removed; and FIGS. 13A and B show in cross sectional view along the line XIII-XIII in FIG. 12 part of a pressurizing device of FIG. 9-12, in perspective view and in flat view respectively; and FIGS. 14A and B show in cross sectional view along the line XIV-XIV in FIG. 12 part of a pressurizing device of FIG. 9-12, in perspective view and in flat view respectively.

In this description embodiments of a beverage dispensing system, container and pressurizing system are disclosed by way of examples only. In the different embodiments the same or similar parts and features have the same or similar reference signs.

In this description embodiments of beverage dispensing systems and especially containers forming such system or forming part thereof will be disclosed, comprising a pressurizing system with which the pressure in a beverage compartment of the container can be regulated. Regulation of pressure should be understood as at least encompassing maintenance of the pressure in the beverage compartment within a predetermined pressure range, at least during periods in which no dispensing takes place. Such regulation can be obtained by a pressure regulator which operates a closure of a high pressure gas container, further also referred to simply as gas container, provided in or for the pressurizing system, such that when the pressure inside the beverage compartment drops the pressure regulator can open a closure of the gas container, allow gas to flow into the beverage compartment, increasing the pressure therein. This will again operate the pressure regulator such that it will allow the closure of the gas container to close again. Such systems are well known in the art and for example disclosed in EP1064221 and WO200035774 and used in the Draught-Keg®, marketed by Heineken, The Netherlands.

In the present disclosure a pressurizing system is disclosed which has a pressure regulating chamber which is in communication with the beverage compartment, such that over a period of time an equilibrium can be obtained between the pressure inside the pressure regulating chamber and the pressure inside the beverage compartment, by flow of gas, especially CO2 gas, from the beverage compartment into the pressure regulating chamber or vice versa.

This can mean that when the pressurizing device is under atmospheric pressure, e.g. outside the beverage container or prior to filling of the beverage container, the pressure inside the pressure regulating chamber of the pressure regulator will be atmospheric too, and thus the closure of a gas container connected to the pressure regulator will be closed and the pressurized gas inside the gas container will stay in said gas container. After filling of the beverage container with a carbonated beverage such as beer and closing the beverage compartment, the pressure inside the beverage compartment will be above atmospheric and thus the pressure regulator will be inactive in the sense that the closure of the gas container will be closed. $CO_2$ gas contained in the carbonated beverage will slowly enter into the pressure regulating chamber, until the pressure inside the pressure regulating chamber is about the same as the pressure in the beverage compartment. Then the pressure regulator and thus the pressurizing device becomes activated, meaning that a relatively quick pressure drop in the beverage compartment, especially due to dispensing of a quantity of beverage therefrom, will lead to the pressure regulator opening the closure for compensation of the pressure drop by feeding gas from the gas container into the beverage compartment until the desired gas pressure inside the beverage compartment has been reached again. Since the gas can only slowly flow into and/or out of the pressure regulating chamber, during the pressure drop in the beverage compartment due to the dispensing of beverage the pressure inside the regulating chamber will be maintained at substantially the same level, thus keeping the pressure regulator active and operative to open the closure of the gas container.

The possibility that over a period of time an equilibrium can be obtained between the pressure inside the pressure regulating chamber and the pressure inside the beverage compartment, by flow of gas, especially CO2 gas, from the beverage compartment into the pressure regulating chamber or vice versa, can also have the advantageous effect that a temperature change in the system, especially of the beverage, can be followed by the pressure regulator. For example after filling of the beverage container the temperature of the beverage may rise, for example during transport and storage, in a store or at a consumers place. This will lead to an increase of pressure in the beverage compartment and, possibly with some delay, in the pressure regulator chamber. Since in a system according to the present disclosure gas can flow from the beverage compartment into the regulating chamber and vice versa during cooling of the beverage, which will take a significantly longer time than the time necessary for dispensing of a serving of beverage, the pressure inside the pressure regulating chamber will easily follow the pressure reduction in the beverage compartment, by gas flowing out of the regulating chamber into the beverage compartment. Similarly, when the temperature of the beverage would rise again, the pressure inside the pressure regulator chamber will also follow a pressure rise inside the beverage compartment due to a temperature change easily and automatically, without significant delay. In a system according to the present disclosure the pressure inside the pressure regulating chamber, referred to also as the regulating pressure, will fluctuate with temperature changes in the container to such extend that the regulating pressure will at different temperatures be in line with the equilibrium pressure of the beverage, which is the pressure at a given temperature at which the gas content of the beverage will be maintained at a desired, predetermined level. Thus at such equilibrium pressure at the given temperature the saturation of gas in the beverage will be maintained at said predetermined, desired level, for example the level of the beverage as original produced. For different temperatures the equilibrium pressure will be different and the regulating pressure will automatically be adapted to that changed pressure.

In the present disclosure an opening between the pressure regulating chamber and the beverage compartment should be understood as meaning any gas connection which allows gas to flow either way between said chamber and said compartment, for substantially obtaining an equilibrium in pressure between the regulating chamber and the beverage compartment over a period of time. Such opening or openings can for example be but is not limited to one or more bores, channels, pinholes, perforations, gas permeable membranes or the like, or for example a passage obtained by surface roughness of mating surfaces or the like.

In the present disclosure a period of time referred to with respect to the period in which gas can flow into or out of the pressure regulating chamber should be understood as a period relatively long compared to the period in which a serving of beverage is dispensed from the beverage compartment. Such serving can for example contain about 0.2 to 0.5 liter or for example about a pint, which will be dispensed within a few seconds. The period of time as indicated over which pressure equilibrium can be reached will in such circumstances be a multiplicity of such dispensing time, for example minutes to tens of minutes, i.e. long enough to maintain the regulating pressure in the pressure regulating chamber during the dispensing of said serving or even several such servings. The regulating pressure in this respect should be understood as meaning the pressure prevailing inside the pressure regulating chamber directly prior to said dispensing of such serving.

A pressure regulating system according to the disclosure will react to a sudden drop in pressure, since than the valve of the gas container will be opened for supplying gas into the beverage compartment, but almost not to sudden pressure increases, since this will only push the movable or deformable wall further into the pressure regulating chamber, compressing the gas therein.

Figure 1:
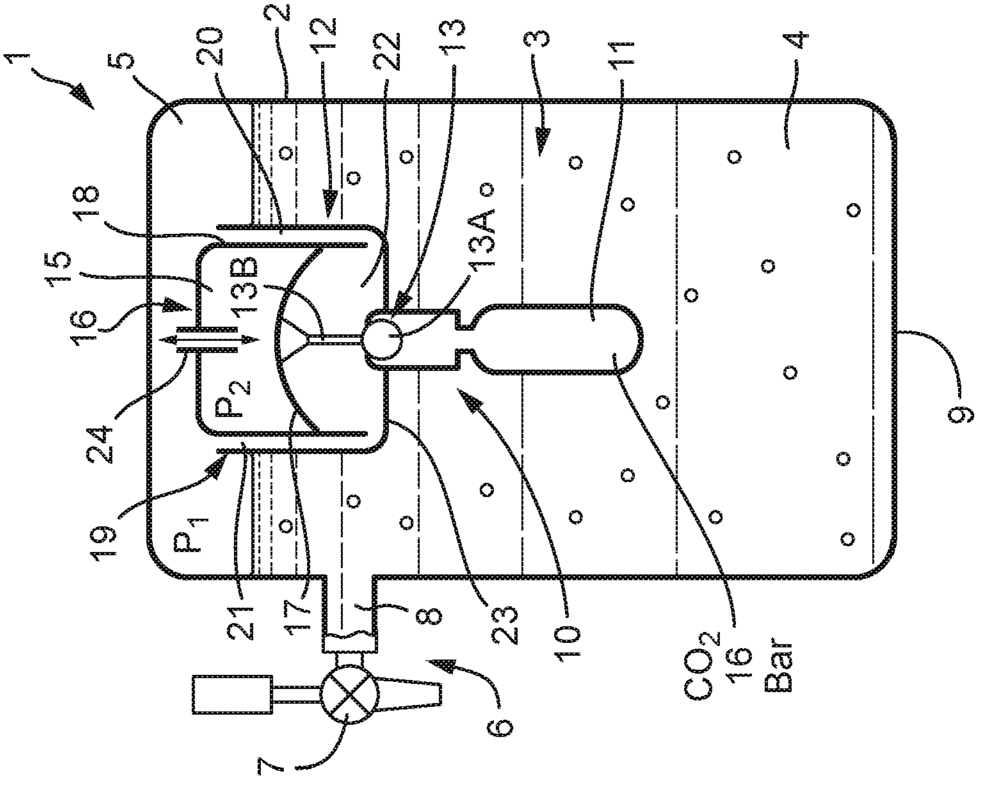
FIGS. 1 and 2 show schematically a container or beverage dispensing system according to the disclosure, with a first embodiment of a pressurizing device in a rest position and during dispensing respectively.
Figure 2:
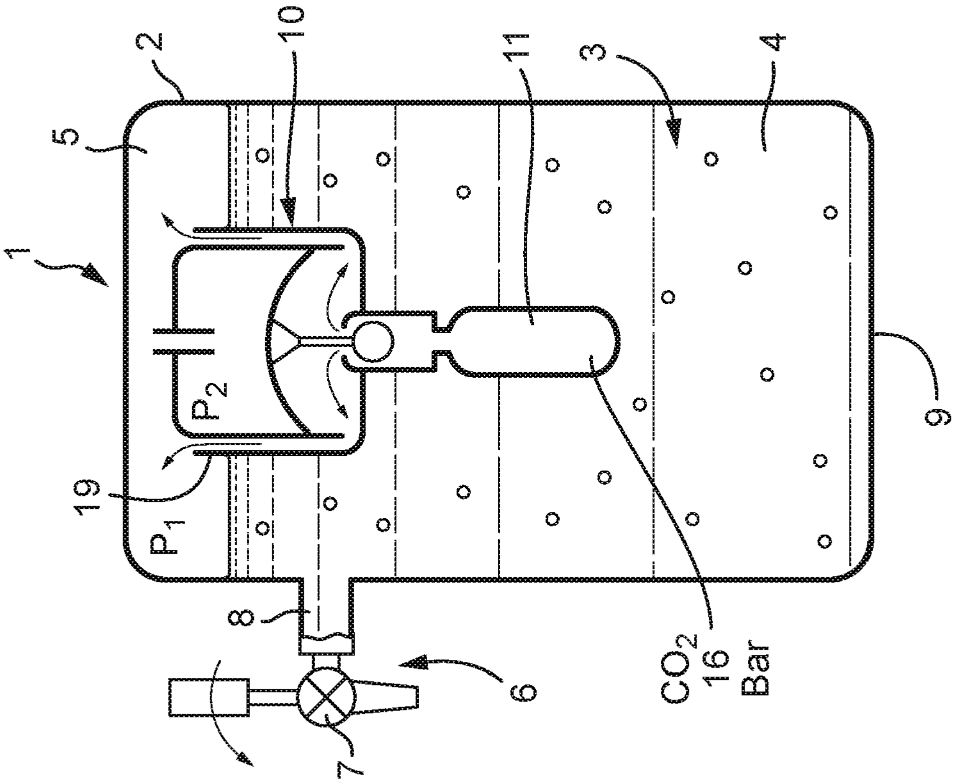
Figure 3A:
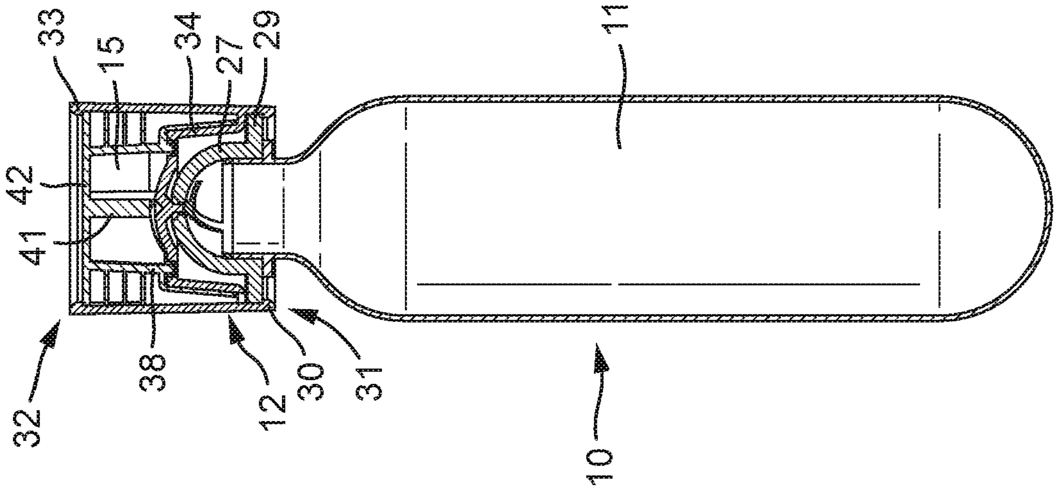
FIG. 3A shows in cross sectional view the embodiment of a pressurizing device of FIG. 3.
Figure 3:
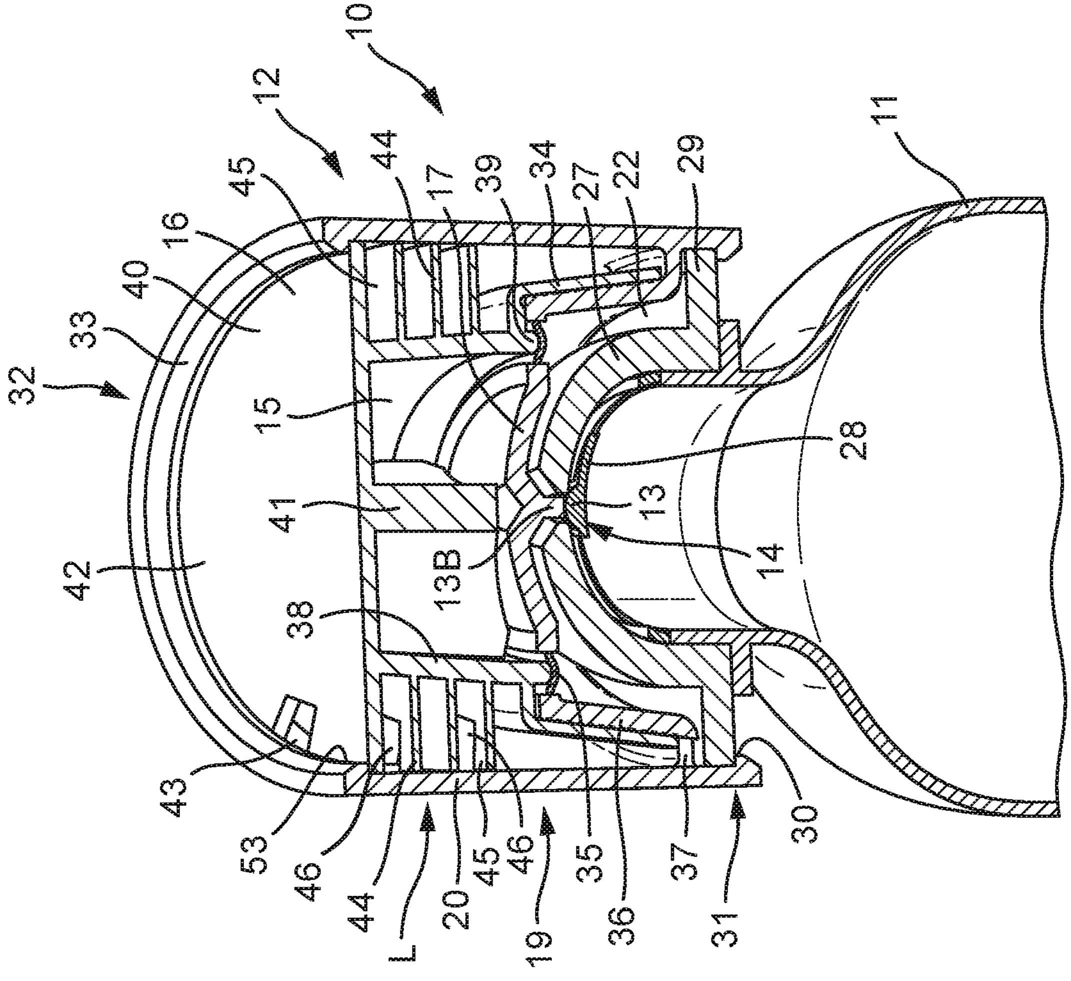
FIG. 3 shows in perspective, sectional view part of an embodiment of an alternative embodiment of a pressurizing device.

FIGS. 1 and 2 show an embodiment of a container 2 forming a beverage dispensing system 1, especially for carbonated beverages such as beer. However, also non-carbonated beverages could be dispensed with such system. The container 2 comprises a beverage compartment 3 at least partly filled with a carbonated beverage such as beer 4. A head space 5 is provided above the beverage 4, filled with gas, in the embodiment shown $CO_2$ gas. For different beverages this could however be a different gas, such as for example but not limited to nitrogen gas, air, oxygen or the like. Schematically a dispensing provision 6 is shown, comprising a tap 7 connected to an outlet 8. A dip tube (not shown) can be connected to the outlet, extending to close to the bottom 9 of the container, in a known manner. Any suitable dispensing provision known can be used with a system 1 of this disclosure with which beverage can be dispensed from the beverage compartment 3.

Inside the container 2, especially in the beverage compartment 3, a pressurizing device 10 is provided, comprising a gas container 11 and a pressure regulator 12. A closure 13 is provided for closing an outlet 14 of the gas container 11. The gas container is 11 filled with pressurized gas such as $CO_2$ gas, for example initially at a pressure of several bar. For example but not limited to above 10 bar, for example about 16 bar or even higher. The amount of gas contained in the gas container 11 is preferably sufficient for dispensing the entire content of beverage from the container 2. A gas adsorbing and/or absorbing material, such as but not limited to active coal may be provided inside the gas container 11, as is known in the art.

The pressure regulator 12 is operative for opening the closure 13 and comprises a pressure regulating chamber 15 in a housing 16. The housing 16 at the side of the gas container 11 is provided with a wall part 17 forming part of the wall 18 of the chamber 15. In this embodiment the wall part 17 is a deformable wall part 17. Alternatively or additionally the wall part 17 can be a movable wall part such as a piston, sealing against an inside of the wall 18 for forming a chamber 15 of which the internal volume can change, as will be discussed. Connected to the gas container 11 is an outer housing part 19, open towards the head space 5, in the embodiment shown at a side opposite the gas container 11. The outer housing part 19 has a peripheral wall 20 surrounding the wall 18 of the chamber 15. Between the peripheral wall 20 and the wall 18 at least one channel 21 is provided connecting the head space 5 with a gas space 22 enclosed between the wall part 17 and a bottom 23 of the outer housing part 19. The at least one channel 21 is such that the gas pressure $P_1$ prevailing inside the head space 5 will be substantially the same as the pressure in said gas space 22, acting on one side of the wall part 17.

In the pressure regulating chamber 15 a second pressure $P_2$ will be present, acting on the opposite side of the wall part 17, that is the side facing inward to the chamber 15. In the wall 18 of the chamber 15 an opening 24 is provided, connecting the beverage compartment 3, especially the head space 5 with the internal volume of the chamber 15. For the sake of clarity in FIGS. 1 and 2 this opening 24 is shown far larger than its actual size. The opening 24 has a cross section which is for example considerably smaller than the cross section of the at least one channel 21 and is preferably at least such that a sudden movement of the wall part 17 into said housing 16, reducing the volume of the chamber 15, or in opposite direction, increasing the volume of the chamber 15, will lead to a pressure change inside the chamber due to the fact that gas cannot flow into or out of the chamber 15 through said opening 24 quickly enough to prevent such pressure change, whereas over a longer period of time such pressure equilibrium can be obtained.

In the embodiment of FIGS. 1 and 2 the closure 13 is provided comprising a ball shaped element 13A connected to the wall 17 by a stem 13B. If the pressure difference over the wall 17 is such that the stem 13B is moved up in FIG. 1 or 2, the ball 13A will be forced into the outlet 14, closing the outlet 14. If however the pressure difference over the wall 17 is such that the stem 13B is moved down in FIG. 1 or 2, the ball 13A will be forced out of the outlet 14, opening the outlet 14. The wall 17 may be formed or tensioned such that it biases the ball 13A into the outlet 14 when there is no pressure difference over the wall 17, especially at atmospheric pressure, for maintaining the outlet closed prior to activation. Obviously other valves can be used in stead, such as an aerosol valve or valves as disclosed in the prior art referred to in the introduction to this specification.

In FIG. 1 the container is shown in rest, i.e. the dispensing provision 6 is closed and no beverage is being dispensed. In the beverage compartment 3 and especially in the head space 5 the first pressure $P_1$ prevails, whereas in the chamber 15 the second pressure $P_2$ prevails. If $P_1$ and $P_2$ are not the same, for example because the container 2 has just been filled and closed, or the beverage is being or has been cooled or heated, compensation will occur over a period of time, such that after such time the pressures $P_1$ and $P_2$ will become the same. For example, if $P_1$ is higher than $P_2$, gas will flow from the head space 5 into the chamber 15, whereas if $P_2$ is higher than $P_1$ gas will flow in the opposite direction, from the chamber 15 into the head space 5. Thus an equilibrium will be obtained between these pressures. Since after filling and closure of the container 2 a relatively long period will be available before the container is used for dispensing, due to at least transport to for example a store, bar or consumer, the period for obtaining such equilibrium may be relatively long, for example hours or even days. Similarly, since cooling or heating of the beverage will not be sudden but will take tens of minutes to several hours, depending on for example the volume and relevant temperature differences, again the period of time over which the gas may flow into and/or out of the chamber can be relatively long, for example minutes to hours.

In FIG. 2 the container 2 is shown during dispensing of a serving of beverage 4. In this stage the tap 7 is opened long enough to dispense a serving of beverage 4 from the container 2 into for example a glass (not shown). During the period of dispensing the pressure $P_1$ will drop relatively quickly. Since the pressure $P_2$ in the chamber during this relatively short period of dispensing will stay substantially the same, the pressure difference over the wall 17 will force the stem 13B in the direction of the gas container 11, thus opening the outlet 14 and allowing gas under pressure to leave the gas container 11 and into the gas space 22, from which it will flow into the head space 5 and beverage compartment 3, increasing the pressure therein back to the desired starting pressure $P_1$. When the pressure $P_1$ is back at the desired pressure the wall 17 will pull the stem 13B back and will close the outlet 14 again.

As discussed, since the flow of gas through the at least one opening 24 into or from the chamber 15 is relatively slow compared to the flow of the beverage during dispensing and the supply of gas from the gas container, the regulating pressure $P_2$ in the chamber 15 will change little to nothing during such dispensing period. The movement and/or deformation of the wall part 17 will moreover be so small that the increase or decrease of volume therein will also hardly influence the pressure $P_2$. Thus the desired regulating pressure and a given temperature will mainly be maintained.

In a pressure regulating device 10 of the present disclosure the regulating pressure is not a fixed pressure but a pressure which will be set dependent on the equilibrium pressure of the beverage to be dispensed, basically irrespective of the temperature of the beverage. The amount of gas leaving the beverage inside the container during a given period of time will be equal to the amount of gas (re)entering said beverage, maintaining the level of saturation of the beverage. Due to the at least one opening 24 a change in the equilibrium pressure due to a temperature change in the beverage will also be followed by the regulating pressure in the pressure regulating chamber and thus the regulator will maintain the desired equilibrium pressure of the beverage at the different temperatures.

As discussed the opening 24 can be provided for in any suitable manner, and can for example be made using a moulding system, a laser, water jet, ultrasound or any known suitable means. Alternatively the at least one opening 24 can be provided by having two or more parts meet, wherein between meeting surfaces a passage is formed for forming an opening, for example by having at least one of the surfaces having a surface roughness different from and especially higher than that of an opposite surface, such that peaks of the surfaces meet and in between such peeks passages are formed through which the gas can flow. Such surfaces can be made by moulding, wherein appropriate surfaces of the mould can be provided with the desired surface pattern and roughness to be transferred to the moulded part or parts, or can be provided on the part or parts after moulding. The desired surface roughness can be applied by for example machining, sanding, etching, blasting such as sand, ice or glass blasting, eroding, such as for example spark eroding, wire erosion, die sinking, casting or any other suitable means known to the skilled person.

Figure 7:
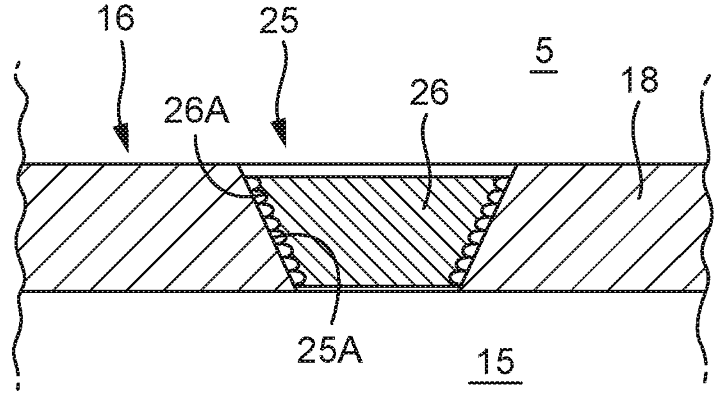
FIG. 7 shows schematically an opening formed into a pressure regulating chamber in an alternative manner.

In FIG. 7 schematically an embodiment of such opening is shown, in cross section, in which a bore 25 is provided in a wall 18 of the housing 16, having a relatively large cross section of for example between 1 and 10 mm, such as for example but by no means limited to about 2 to 5 mm. A side edge 25A of the bore 25 may be angled, such that the bore 25 tapers slightly, especially narrowing in the direction of the chamber 15. The side edge 25A can for example have a relatively low surface roughness, for example but not limited to a roughness averagely obtained by injection moulding plastics, for example but not limited to a Ra of between 0.1 and 1.6 μm. The outer surface 26A of a plug 26 inserted, especially pressed into the bore 25 may have a higher surface roughness, for example but not limited to a Ra of between 1.6 and 25 μm, wherein the roughness is orientated such that miniature channels are obtained between peaks or ridges of the surface roughness allowing gas to pass between the plug and the edge 25A of the bore 25, from the head space 5 to the chamber 15 or vice versa. The applicable or suitable roughnesses and dimensions can easily be defined by the skilled person, depending on i.a. on dimensions of bore 25 and plug 26, pressure of inserting the plug 26 in to the bore 25, gas pressures prevailing and desired flow from the head space 5 to the chamber 15 or vice versa.

In FIG. 3-6 an alternative embodiment of a pressurizing device 10 is shown in which in this embodiment the gas container 11 is provided with an open neck, closed by a substantially dome shaped hood 27 defining an outlet opening 14 at or near the apex of the hood 27. At the side facing inward to the gas container 11 is a closing element 13, in this embodiment attached to the hood 27 by at least one spring element 28 biasing the closing element 13 against and/or into the opening 14, closing the outlet opening 14. The hood 27 and closing element 13 with spring element(s) 28 may be made of plastic or any other suitable material, as can the gas container 11.

In the embodiment of FIG. 3-6 the pressure regulator 12 is mounted on a flange 29 of the hood 27, by a click ring 30 or similar provision. The pressure regulator 12 may also be mounted in a different manner. In this embodiment the pressure regulator 12 comprises an outer housing 19 and an inner housing 16. The click ring 30 is provided at a lower end 31 of the outer housing, which is substantially cylindrical. At the opposite upper end 32 a similar click ring 33 is provided. Near the lower first end a cross wall 34 is provided in the outer housing 19, having a substantially truncated cone shape. An upper part forms a movable wall 17 of a regulating chamber 15 and is via a flexible ring 35 connected to the truncated cone shaped wall part 36. At least one opening 37 is provided in said cross wall 34, in this embodiment at a transition between the outer cylindrical wall 20 and the truncated wall part 36, just above the flange 29. The flange 29 is locked in place between the click ring 31 and the lower end of the truncated wall 34.

Central to the wall part 17 is a short stem 13B, which extends into the opening 14 in the hood 27, for engaging the closure element 13. Thus if the movable wall part 17 is moved towards the hood 27 the stem 13B will push the closure element 13 away from the opening 14, opening the closure and allowing gas to flow from the gas container 11 into the gas space 22 between the truncated wall 34 and the hood 27, below the wall part 17. From this gas space 22 the gas can flow through the opening 37 into the labyrinth L and/or to the beverage compartment 3, as will be discussed.

Within the cylindrical wall 20 of the outer housing the inner housing part 16 is locked. This inner housing part 16 comprises a substantially cylindrical or truncated conical wall 38, having an open lower end 39 resting on the flexible ring 35 and a closed opposite end 40. Within the wall 38 and between the wall part 17 and the opposite end 40 the pressure regulating chamber 15 is formed. A wall 41 may be provided within the chamber 15 in order to prevent the wall part 17 from coming up too far. The end 40 is closed by an end wall 42 which extends passed the truncated conical wall 38, such that a peripheral edge 53 will engage below the click ring 33, thus locking the inner housing part 16 in position. An opening 43 is provided in said end wall 42, close to the click ring 32 or at least spaced apart from the chamber 15. This opening 43 therefore opens into a space between the walls 38 and 19A.

Figure 4:
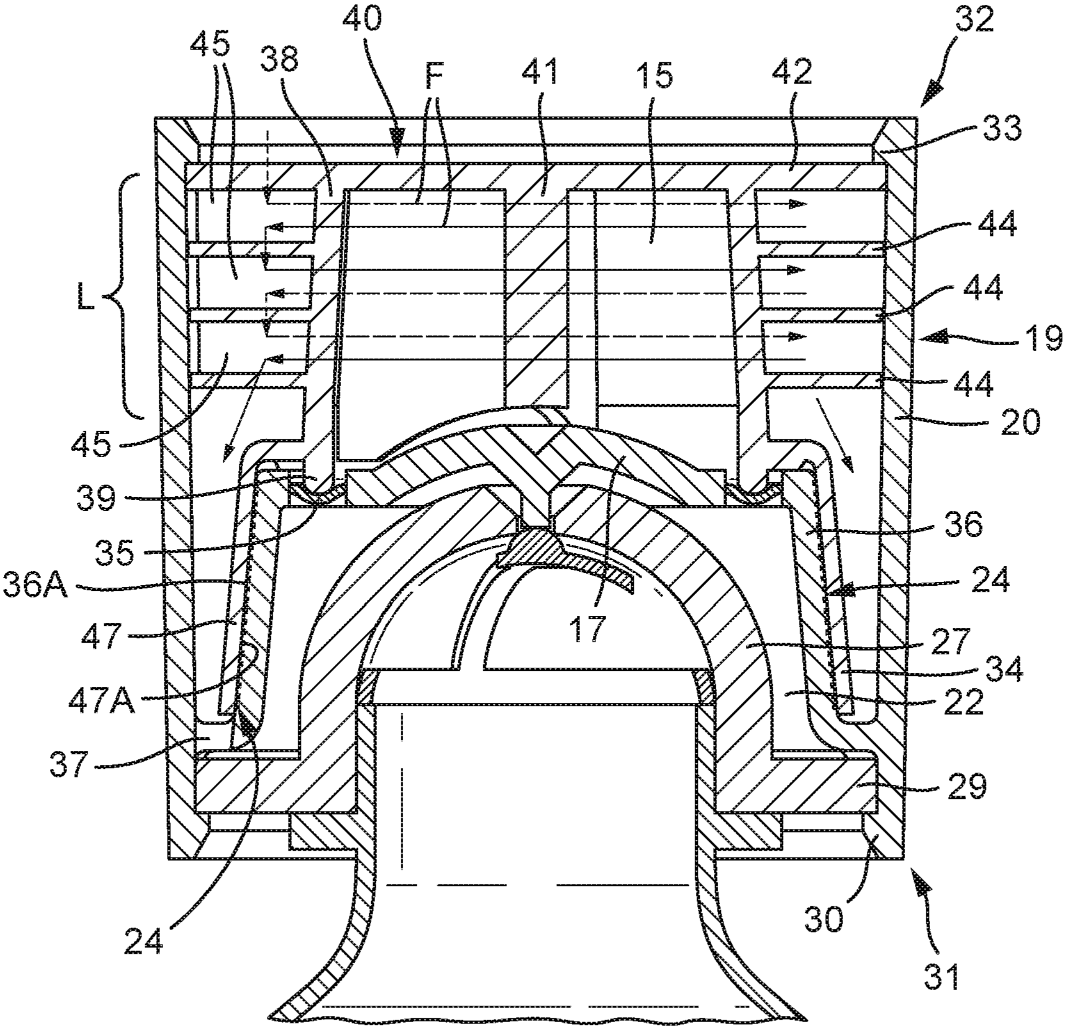
FIG. 4 shows in cross sectional view part of a pressurizing device of FIG. 3, disclosing a pressure regulator and the top of a gas container with closure, in closed position, showing the flow path of gas towards a pressure regulating chamber.

Between the end wall 42 and the lower end 39 of the truncated wall 38 a series of substantially parallel ring shaped flanges 44 extend, outward from the wall 38, which abut the inside of the wall 20 with their peripheral edges, such that a series of ring shaped spaces 45 are provided around the wall 38. Each of the flanges 44 is provided with an opening 46, in varying positions, such that they are not in a straight line above each other. This means that a labyrinth L is formed, through which gas can pass from the opening 37 to the opening 43 or vice versa, through all of the spaces 45, as is schematically shown in FIG. 4 by the arrows F drawn in. This labyrinth L therefore forms a relatively long channel or passage for the gas, which will prevent any beverage which might enter into the opening 43 from flowing all the way to the opening 37 or beyond and, more importantly, from flowing to the opening or openings 24 and blocking this or these opening(s) 24 for passage of gas into and/or out of the pressure regulating chamber 15.

From just above the lower end 39 of the wall 38 a slightly wider second truncated conical wall 47 extends downward, which rests with an inner surface area 47A against an outer surface area 36A of the wall 36. At least one of the surface areas 47A and 36A may have a relatively high surface roughness, whereas the other may have a lower surface roughness. Preferably the surface areas 36A, 47A have different surface roughnesses. These surface roughnesses are chosen such that the surface areas 36A, 47A do not fit together such that they close off any possible passage of gas there between. The surface roughnesses are preferably chosen such that between the surface areas 36A, 47A a series of passages is formed, together forming an opening 24 or a series of such openings 24 for allowing gas to flow into and out of the chamber 15, especially slowly.

By way of example only, which should by no means be understood as limiting the scope in any way, the surface roughnesses can for example be between 0.3 and 0.8 Ra, for example about 0.6 Ra, or at least one of the surfaces may have such roughness, whereas the other may be smoother. As discussed before, a skilled person will be able to define the appropriate surface roughnesses and possible surface patterns in order to obtain the desired flow, given for example pressures during use, sizes, dimensions and materials used, desired delay in bringing the pressures in the chamber 15 and the head space 5 to an equilibrium again and the like.

Figure 5:
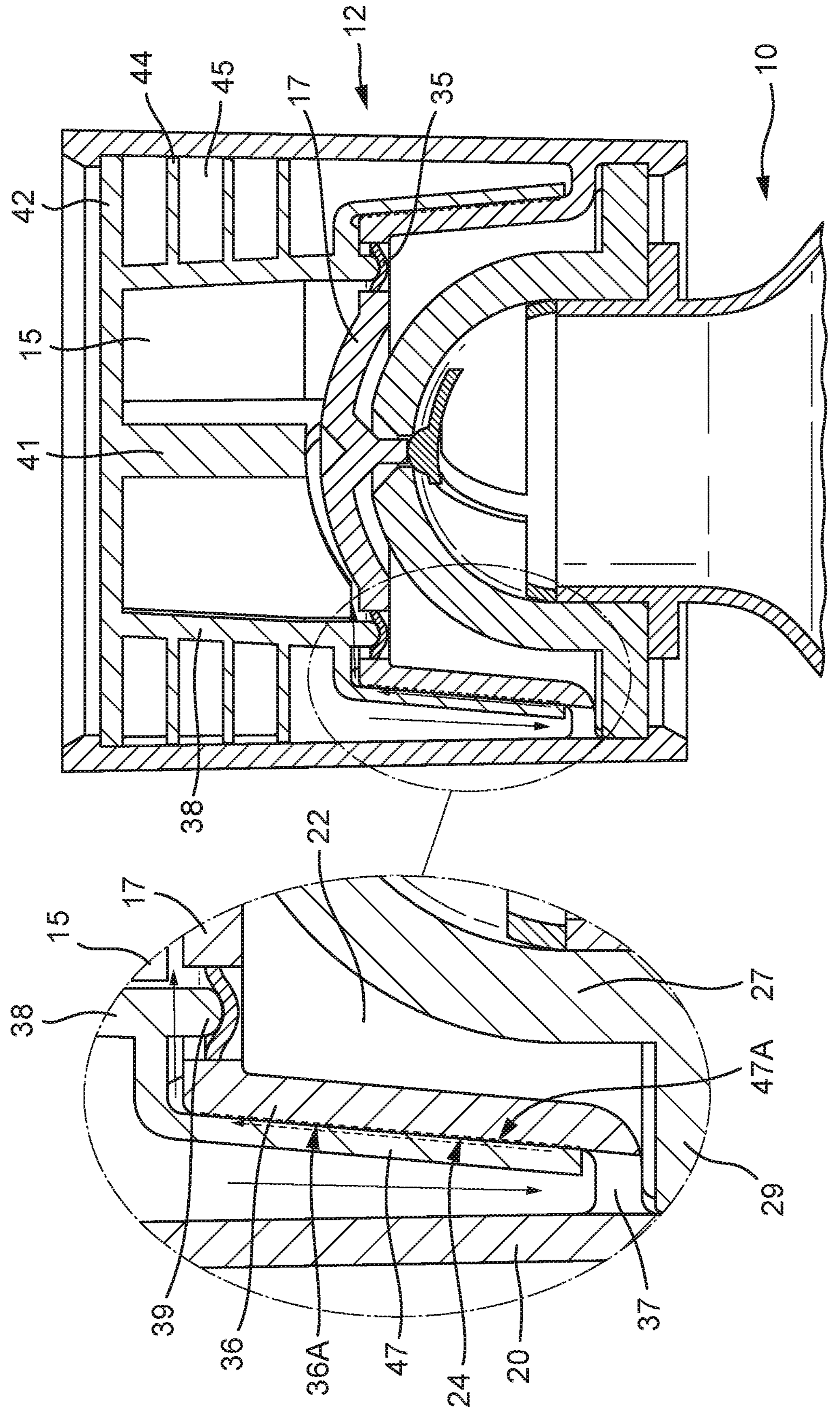
FIG. 5 shows in cross sectional view the part of the pressurizing device as shown in FIG. 4, with at an enlarged scale part of the pressure regulator with an opening into the pressure regulating chamber.

As is schematically shown in FIG. 5 gas can flow from the labyrinth L through the opening 37 into the gas space 22 but also into the or each opening 24 between the surface areas 36A, 47A, and thus flow into the chamber 15 if the pressure $P_2$ inside the chamber 15 is lower than the pressure $P_1$ in the head space 5 cq gas space 22. Similarly gas could leave the chamber 15 passing through said at least one opening 24 formed between the surface areas 36A, 47A if the pressure $P_2$ inside the chamber 15 is higher than the pressure $P_1$ in the head space.

Figure 6:
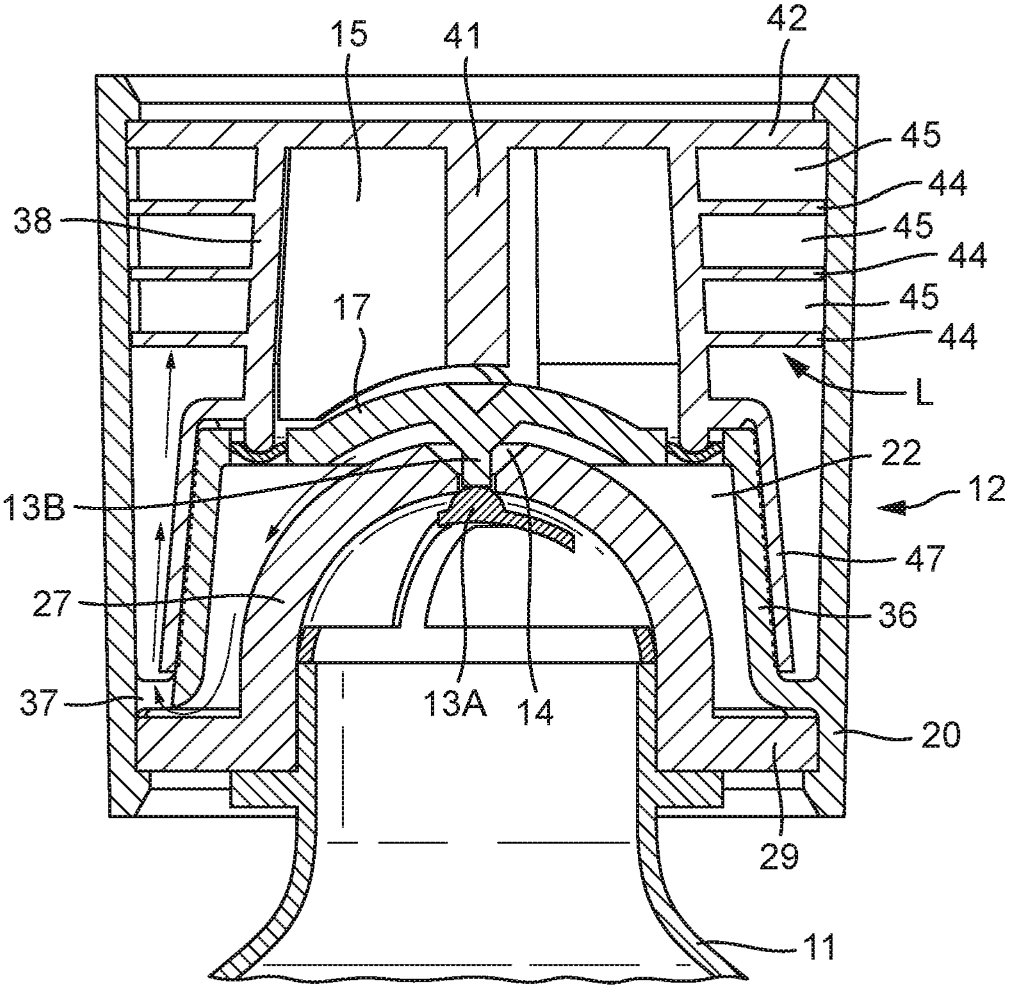
FIG. 6 shows in cross sectional view part of a pressurizing device of FIG. 3, as shown in FIGS. 4 and 5, disclosing the pressure regulator and the top of a gas container with closure, in open position, showing the flow path of gas from the gas container.

As is schematically shown in FIG. 6 the gas coming from the gas container 11 when the closure 13 has been opened, will flow into the gas space 22 and passing through the opening 37 will then flow into the labyrinth, in order to flow out the opening 42 into the beverage compartment 3 and especially the head space. This can have the advantage that any beverage that might have entered into the labyrinth will be blown out by the pressurized gas flowing in the opposite direction. This prevents blockage of the labyrinth L in a very simple and accurate way. This may especially be advantageous when the pressure regulator is susceptible to being submerged at least partly into the beverage.

FIG. 9-14 show an alternative embodiment of a pressure regulating device 10, again having a gas container 11 and a pressure regulator 10 connected thereto. The pressure regulator device is similar to the previous embodiments, the same features having the same or similar reference signs. Here below mainly the differences with respect to the previous embodiments shall be discussed.

FIG. 9 schematically shows a pressure regulating device 10 comprising a pressure gas container 11 and a pressure regulator 12. In this embodiment a dispense valve 7A is integrated in the pressure regulator 12, especially in a housing thereof, which valve 7A at a lower end is connected to a riser pipe 50 which, when introduced into a container 1 similar to FIGS. 1 and 2, can reach to a lower side of the container, in a known manner. The valve 7A can for example be an aerosol type valve or an other type of valve which can be opened by for example pushing, pulling or tilting of a valve body, by squeezing or any other suitable type of valve. A similar riser pipe 50 could be provided in the other embodiments. In this embodiment the riser pipe extends alongside the gas container 11 such that a relatively compact unit is obtained. FIG. 10 shows at an enlarged scale the pressure regulator 12 mounted to the container 11.

In FIG. 9-12 a lid 51 has been removed from the end 40 of the pressure regulator 12, showing a labyrinth L at said end 40. In this embodiment a path LA of the labyrinth L is placed in a plane substantially perpendicular to a longitudinal axis A-A of the gas container 11 and of the pressure regulator 12, which longitudinal axis may coincide. In this embodiment the housing 20 of the pressure regulator 12 has a closed end wall 42 on which the labyrinth L is formed, preferably integral with the wall 42, by upstanding walls 52, forming the path LA, extending between an opening 43 and opening 37. The opening 43, which is close to an edge of the wall 42, will, when the device 10 has been enclosed in a container, open into the beverage compartment of the container 2. The opening 37 will open into the space 22 and will thus be in communication with the at least one opening 24 opening into the pressure regulating space 15, similar to the before described embodiments. When a lid 51 is placed on the wall 42, it will extend over and be in contact with the walls 52, thus closing the labyrinth L such that gas can only pass through the labyrinth from the opening 37 to the opening 43 and vice versa.

Again the labyrinth L and especially the relative length of the path 7A there through will prevent beverage, should it enter into the opening 43, from reaching the opening 37 or beyond, and especially from reaching the at least one opening 24 into the chamber 15. Moreover, since gas expelled from the gas container 11 can only get into the beverage compartment of the container through the labyrinth L, any beverage that might have entered into the labyrinth through opening 43 will again be expelled by the gas flowing at high pressure through the labyrinth L.

FIGS. 13A and B and FIGS. 14A and B show two cross sections of the pressure regulator 12 and part of the container 11 of a device 10, in perpendicular planes. In this embodiment the gas container 11 is provided in or on a neck thereof with a wall 29, having an outer edge connected to the wall 20. This can again be a click connection or any other suitable connecting means, as long as it is liquid and gas tight. A central portion 60 of the wall 29 in this embodiment is formed such that it extends into the container and is provided with an opening 14, but the wall 29 could obviously also be formed differently, for example substantially flat. Under the opening 14 a closing element 13 is provided, for example connected to the wall 29 by a spring element 28, for example similar to the previous embodiments, which is biased by such spring element and/or the gas pressure inside the container 11 towards a position in which the element 13 closes off the opening 14. Again a stem 13A is provided, extending into and/or through the opening 14 and engaging the element 13, for forcing it away from the opening 14, in order to allow gas to flow out from the container into the space 22, as will be discussed further.

The wall 29 can be connected to the container in any suitable way, such as but not limited to glue, welding, click means, press fit, screw threads, bayonet connection or the like, forming a gas tight connection.

In this embodiment within the pressure regulator 12 a first part 54 is provided, having a circumferential wall 36 and a closing wall 17 forming a deformable wall such as a membrane, or at least part of said wall 17 may be deformable. Centrally the stem 13A is provided on the wall 17. In the embodiment shown the stem 13A is shown as an end of a conical central part 17A of the wall 17. The central part 17A can have a larger wall thickness, which means that any deformation in the wall 17 will substantially com from the ring shaped part 17B between the central part 17A and the peripheral wall 36. The ring shaped part 17B can have undulations 17C or the like for increasing the flexibility and/or elastic deformability.

The wall 17 is positioned at a side facing the container 11, and the peripheral wall extends in the opposite direction. The peripheral wall 36 has an inside surface 36A which is inclined relative to the axis A-A, such that the first part 54 has an inner shape which is substantially truncated, with the smaller end at the wall 17 and open at the opposite wider end 55. The first part 54 can rest on the wall 29 such that at least one opening is provided there between for allowing gas to pass under the wall 17 and between the wall 36 and wall 29 into the space 22, as will be discussed.

A second part 56 is provided, at least partly inside the first part 54. The second part 56 has a closed end wall 57 and a peripheral wall 47. The peripheral wall 47 has an outer surface 47A which is inclined relative to the axis A-A, such that the outer shape of the second part 56 is substantially truncated, in outer shape and dimensions for example substantially corresponding to the inside volume of the first part 54. The second part 56 has been pressed from the open wider end 55 into the first part 54, such that the surfaces 36A and 47A are in contact with each other.

Similar to the surfaces 36A and 47A of the previously discussed embodiments at least one of these surfaces 36A, 47A has a specific surface roughness, such that when the two surfaces 36A, 47A mate as shown, at least one opening 24 is formed between them, connecting the space 22 with a chamber 15 enclosed between the first and second part 54, 56, similar to the previous embodiments. Inside the chamber 15 a wall 41 can again be provided, for example extending from the end wall 57, which can limit the path of travel of the wall 17 and especially the central part 17A thereof into the chamber 15. Between the end wall 57 and the wall 42 channels or a space 58 may be provided, such that gas can pass between the space 22 and the channel 7A of the labyrinth through the opening 37.

Figure 8:
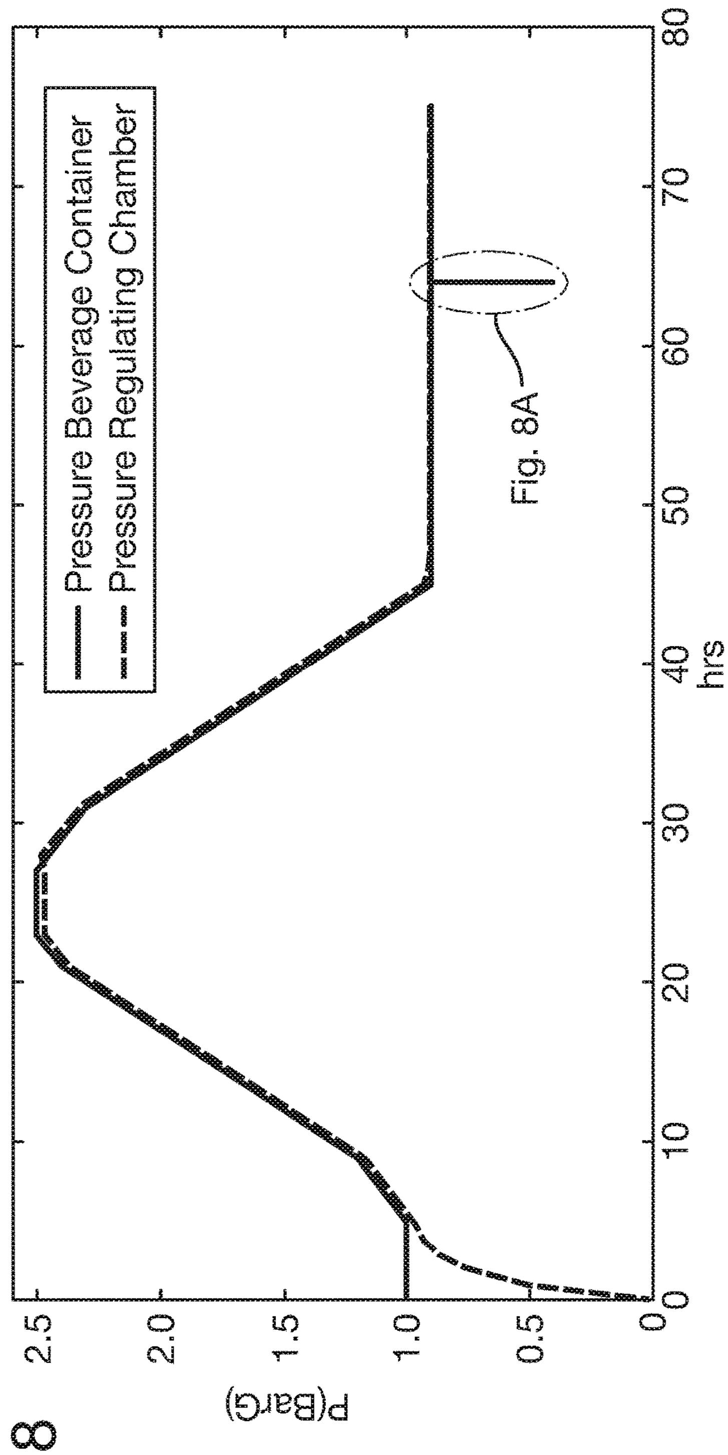
FIG. 8 shows a chart showing a the pressure changes in the beverage compartment and the pressure regulating chamber directly after filling, during and after dispensing, wherein the container is kept at a constant temperature during dispensing and thereafter.

During use a pressure regulating device 10 of the disclosure will be positioned in a container 1 which will contain beverage, especially carbonated beverage such as beer. In FIG. 8 schematically the relationship between the pressure inside the container, i.e. of the beverage and the pressure inside the chamber 15 of the pressure regulator 12 is shown.

Prior to introducing the pressure device into the container 1 and filling the container 1 with the beverage the pressure inside the chamber 15 will be atmospheric, as will the pressure surrounding the chamber 15 be, such as inside the space 22 and around the pressure regulator 12. The wall 17 will be in a position in which the container 11 is closed. For example the opening 14 will be closed by the element 13. No gas will flow out of the container 11, not even in the atmospheric environment. Thus the regulator will not be operative in this position. In this position it can therefore be stored and transported without the risk of gas leaving the container 11.

After introducing the pressure regulator into the container 1, for example in a filling station, the container will be filled with relatively cool beverage, which will have a pressure above atmospheric pressure, for example but not limited to about 1.8 to 2.2 bar absolute or, as shown in FIG. 8, about 1 BarG, at which pressure the container will be closed. In this position the pressure inside the chamber 15 15 will be atmospheric and thus will be 0 BarG, as shown in FIG. 8 at the extreme left. The filling pressure may for example depend on the type of beverage, the type of gas in the beverage, if any, an equilibrium pressure of such gas in such beverage at the filling temperature and the like factors known to the skilled person.

After closure of the container 1, in FIG. 8 at the lower left hand corner of the graph, the pressure in the chamber 15 will rise relatively slowly, by gas flowing from the head space 5 of the container 1, through the labyrinth L if provided for, and through the opening 24 into the chamber 15, until the pressure inside the chamber 15 will be substantially equal to the pressure in the head space 5 i.e. the pressure of the beverage, which will be the equilibrium pressure of the beverage at the instant temperature. In FIG. 8 this point is reached after about 5 hours from closing the container.

After filling and closing the container 1 this will normally be stored and transported, for example to a shop, bar or restaurant and/or consumer, during which period the temperature of the beverage may increase, due to no or only little cooling. Due to the rising temperature also the pressure in the head space 5 will increase, in line with the equilibrium pressure of the beverage. Since this increase will proceed relatively slowly, the rise in pressure of the head space will easily and automatically be followed by the pressure inside the chamber 15, due to flow of gas from the head space 5 through the opening or openings 24 into the chamber 15. This is represented in FIG. 8 by the two almost coinciding lines between about 5 and about 22 hours after filling. Then the pressure may be kept relatively constant for a time, in FIG. 8 shown as a period between about 22 and about 28 hours after filling.

When the container 1 with the beverage 4 is then cooled again, the pressure in the head space 5 will decrease again, followed by the pressure inside the chamber 15. Since this decrease will proceed relatively slowly, for example at a similar rate as the pressure rise, the decrease in pressure of the head space 5 will easily and automatically be followed by the pressure inside the chamber 15, due to flow of gas from the chamber 15 through the opening or openings 24 into the head space 15 again, as represented in FIG. 8 by the two almost coinciding lines between about 28 and 45 hours after filling.

Cooling of the beverage 4 will take a number of hours, for example 10 to 12 hours, as shown by way of example only in FIG. 8. Then the beverage can be kept at a desired cooled temperature, for example but not limited to about 6° C. for a lager type beer. At the preferred temperature an equilibrium pressure for the beverage will be present in both the head space 5 and the chamber 15. In FIG. 8 by way of example only such equilibrium pressure is shown as for example about 0.9 BarG (or about 1.9 Bar absolute), which should by no means be understood as limiting in any way.

Figure 8A:
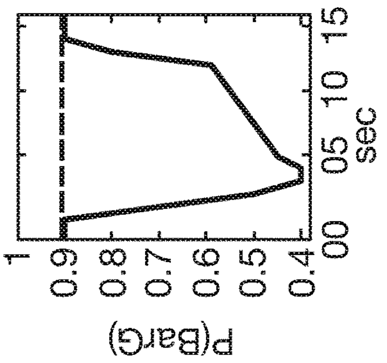
FIG. 8A shows at an enlarged scale part of the graph of FIG. 8, showing the pressures and pressure changes during dispensing of a serving of the beverage from the container.

In FIG. 8 about 65 hours after filling of the container a serving of beverage is dispensed from the container 1 through the tapping valve 7, 7A, driven out at least partly by the prevailing pressure inside the container 1. The period of serving is indicated in FIG. 8 as a spike S down from the substantially horizontal lines representing the pressures prior to and after said serving. Such serving can for example be about 0.2 or 0.3 liters. In FIG. 8A at an enlarged scale the pressure change in the beverage compartment 3 is shown in relation to the pressure inside the chamber 15 during such dispensing. As shown the dispensing will lead to a relatively sudden, quick decrease in the pressure inside the container 1, represented by the solid line in FIGS. 8 and 8A, since in a relatively short period of time, for example but not limited to a few to about 10 to 20 seconds, the beverage volume inside the container 1 will be reduced by the volume of the serving. This will mean that the pressure in the space 22 will drop too, leading to a movement and/or deformation of the wall or wall part 17 opening the valve 13 and allowing gas to flow under pressure from the container into the space 22 and from there into the container 1, preferably into the head space 5, in order to increase the pressure inside the beverage compartment 3 again, back to the equilibrium pressure at the given temperature.

Since, as discussed, the opening or combined openings 24 will only allow a very limited flow of gas from the head space 5 into the chamber 15 or vice versa, i.e. a low volumetric flow rate ($m^3/s$), compared to the much higher volumetric flow rate of the beverage being dispensed, the pressure inside the chamber 15 during such dispensing will not change, at least not in any way significantly, as is shown by the dotted line in FIGS. 8 and 8A. Thus the pressure regulator 12 will regulate the pressure at the regulating pressure corresponding to the equilibrium pressure of the beverage at the given temperature as prevailing at the start of the dispensing. Thus almost directly after closing the dispensing valve 7, 7A after dispensing the said serving the pressure inside the container 1 will be back at the equilibrium pressure, as schematically shown in FIGS. 8 and 8A at the right hand side.

From the forgoing it follows that the pressure inside the pressure regulator, especially in the chamber 15, can follow relatively slow changes in pressure in its surroundings, such as the pressure in a beverage compartment, but cannot follow sudden changes in such pressure, for example resulting from dispending part of the content of such container or increasing the volume thereof quickly. It shall be clear to the skilled person that at least by defining the volumetric flow rate of the opening or openings 24 into and/or out of the chamber 15 of the pressure regulator 12 the response time of a pressure regulator can be influenced. Response time should be understood as the time necessary for a pressure regulator to adapt to a pressure change in the surroundings, such as a beverage compartment in which it is provided. A longer response time will mean that a pressure change in the surrounding, such as the beverage compartment 3, can be maintained over a longer period of time before it will be followed by a similar pressure change inside the chamber 15.

By using a labyrinth L between opening 37 and opening 43 or at least between opening or openings 24 and the beverage compartment 3, a relatively compact pressure regulator can be provided, especially with a relatively limited height, without reducing the length of the channel LA through which the gas has to pass unnecessarily. As indicated a relatively long path LA will prevent any beverage entering the channel from reaching the opening or openings 24. Beverage reaching the opening or openings 24 could lead to blockage of at least part of said opening or openings, which would prevent gas from flowing into and/or out of the chamber 15. In embodiments in which beverage cannot reach the opening or openings 24, for example because the pressure regulator is kept above the level of the beverage in the beverage compartment 3, such channel LA. Such as formed by the labyrinth L, could be omitted or at least reduced in length. Alternative to the labyrinth L a channel LA could be provided in a different manner, for example by a pipe or channel being for example substantially straight or wound, for example spiraling around part of the container 11 or zig-zagging, U shaped or any other suitable shape and dimensions. The channel LA is preferably such that any beverage entering the channel will be blown out by gas passing in the opposite direction, under pressure, from the container 11 into the beverage compartment 3.

The invention is by no means limited to the embodiments specifically shown and discussed in this disclosure. Any number of alterations and modifications is possible within the scope of the appending claims, including but not limited to combinations of parts of embodiments as shown. For example in stead of a movable or deformable wall part 17 directly attached to further parts of a housing of the pressure regulator, a movable wall part could be used forming a separate part, such as for example a piston. In stead of the closure of the gas container 11 as specifically disclosed, another type of closure such as a valve could be used, for example an aerosol type vale as disclosed and used in for example WO00/035774, especially FIGS. 2 and 3 thereof, which valve may be of the male, female or tilting type. A similar valve can be used as a dispensing valve 7. Other surface areas may be used for forming the or an opening 24 into the pressure regulating space 15. The labyrinth L may have different shape and dimensions, may have more or less spaces and may even be omitted entirely. In a beverage dispensing system according to the disclosure the outlet can be connected to a different dispensing provision, such as for example but not limited to a remote tapping column by a dispense line connected to the outlet. The container and especially the beverage compartment thereof may have any desired volume. The pressure regulator can be provided in a wall of the container such that the gas container with the hood can be inserted into said pressure regulator from outside the container prior to use of the container, in stead of the described positioning of the pressurizing device with the pressure regulator inside the container, the opening 42 opening into the beverage compartment and the outer housing 19 sealing gas tightly to the flange 29.

These and various other modifications are considered falling within the scope as defined by the appending claims.

The invention claimed is:

1. A method for regulating pressure in a beverage compartment of a beverage container, using a volume of pressurized gas, wherein a pressure regulator is used for allowing gas to enter from the volume of gas into the beverage compartment controlled by a valve, wherein the pressure regulator comprises a regulating chamber having at least a wall part movable and/or deformable based on pressure in the beverage compartment, opening and closing said valve, wherein the regulating chamber is separated from the beverage compartment by at least a second wall part, wherein gas is passed from the beverage compartment into the pressure regulating chamber and gas is passed from the pressure regulating chamber into the beverage compartment through an opening in a wall of the pressure regulating chamber.

2. The method according to claim 1, wherein the volume of gas is stored inside a gas container, wherein the gas container is closed by said valve and the said at least movable and/or deformable wall part is brought in operational contact with the valve.

3. The method according to claim 1, wherein during dispensing of beverage from the beverage compartment the pressure inside the beverage compartment is allowed to drop, resulting in movement and/or deformation of the at least movable and/or deformable wall part resulting in an increase in volume of the regulating chamber and in opening the valve, allowing gas to flow from the volume of gas into the beverage compartment.

4. The method according to claim 3, wherein during said increase of the volume of the regulating chamber gas flows into the regulating chamber from the beverage compartment at a flow rate such that a pressure drop inside the regulating chamber is not compensated by said inflow of gas into the regulating chamber during said dispensing of beverage from the beverage compartment, whereas after said dispensing gas flows into and/or out of the regulating chamber such that pressure equalization occurs between the beverage compartment and the regulating chamber.

5. The method according to claim 4, wherein the flow rate is regulated by the dimensions of said opening or combination of said openings, wherein liquid is prevented from flowing into the regulating chamber by said dimensions of said opening or openings.

6. The method according to claim 1, wherein the beverage compartment is filled at least partly with a carbonated beverage, wherein over an extended period of time, when no beverage is dispensed, temperature changes of the beverage leading to a change of pressure in the beverage compartment is followed by the same pressure change inside the regulating chamber by feeding gas into the regulating chamber from the beverage compartment or feeding gas from the regulating chamber into the beverage compartment, though said at least one opening.

7. A method for regulating pressure in a beverage dispensing system, said beverage dispensing system comprising a beverage container with a beverage compartment and a pressurizing system, wherein the pressurizing system comprises a gas container comprising a pressurized gas, a closure closing the gas container and a pressure regulator operative for opening the closure for allowing gas to enter from the gas container into the beverage compartment, wherein the pressure regulator comprises a regulating chamber having at least a wall part movable and/or deformable based on pressure in the beverage compartment, wherein at least one opening is provided through a wall of the regulating chamber providing for at least part of a gas passage between the regulating chamber and the beverage compartment, wherein the beverage compartment is filled at least partly with a carbonated beverage, wherein over an extended period of time, when no beverage is dispensed, temperature changes of the beverage leading to a change of pressure in the beverage compartment is followed by the same pressure change inside the regulating chamber by feeding gas into the regulating chamber from the beverage compartment or feeding gas from the regulating chamber into the beverage compartment, though said at least one opening, wherein the gas introduced from the beverage compartment into the regulating chamber or from the regulating chamber into the beverage compartment is fed through a labyrinth having an end in fluid communication with the beverage compartment and an opposite end in fluid communication with the at least one opening.

8. A method for regulating pressure in a beverage dispensing system, said beverage dispensing system comprising a beverage container with a beverage compartment and a pressurizing system, wherein the pressurizing system comprises a gas container comprising a pressurized gas, a closure closing the gas container and a pressure regulator operative for opening the closure for allowing gas to enter from the gas container into the beverage compartment, wherein the pressure regulator comprises a regulating chamber having at least a wall part movable and/or deformable based on pressure in the beverage compartment, wherein at least one opening is provided through a wall of the regulating chamber providing for at least part of a gas passage between the regulating chamber and the beverage compartment, wherein the beverage compartment is filled at least partly with a carbonated beverage, wherein over an extended period of time, when no beverage is dispensed, temperature changes of the beverage leading to a change of pressure in the beverage compartment is followed by the same pressure change inside the regulating chamber by feeding gas into the regulating chamber from the beverage compartment or feeding gas from the regulating chamber into the beverage compartment, though said at least one opening, wherein the at least one opening is formed between a wall part of an aperture in a wall of the regulating chamber and a plug inserted in said aperture, wherein the gas is fed through the at least one opening passing between said wall part of the aperture and the plug.

9. The method according to claim 8, wherein the at least one opening is formed by surface roughness of the wall part of the aperture and of a wall part of the plug adjacent the said wall part of the aperture.

* * * * *